United States Patent
Carvalho

(10) Patent No.: US 11,965,651 B2
(45) Date of Patent: Apr. 23, 2024

(54) PROCESS FOR PRODUCING BIOMASS BY TREATMENT OF ORGANIC WASTE WITH TWO-STEP DRYING

(71) Applicant: Jorge Luis Osório Carvalho, Rio de Janeiro (BR)

(72) Inventor: Jorge Cortizo Carvalho, Rio de Janeiro (BR)

(73) Assignee: Jorge Luis Osório Carvalho, Rio de Janeiro (BR)

( * ) Notice: Subject to any disclaimer, the term of this patent is extended or adjusted under 35 U.S.C. 154(b) by 379 days.

(21) Appl. No.: 17/280,182

(22) PCT Filed: Sep. 25, 2019

(86) PCT No.: PCT/BR2019/000030
§ 371 (c)(1),
(2) Date: Mar. 25, 2021

(87) PCT Pub. No.: WO2020/061661
PCT Pub. Date: Apr. 2, 2020

(65) Prior Publication Data
US 2022/0003410 A1    Jan. 6, 2022

(30) Foreign Application Priority Data

Sep. 25, 2018    (BR) .......................... 1020180696351

(51) Int. Cl.
*F23G 5/04*    (2006.01)
*B65G 69/20*    (2006.01)
(Continued)

(52) U.S. Cl.
CPC ............... *F23G 5/04* (2013.01); *B65G 69/20* (2013.01); *F26B 3/04* (2013.01); *F26B 23/028* (2013.01); *F23G 2201/10* (2013.01); *F23G 2201/60* (2013.01); *F23G 2201/90* (2013.01); *F23G 2206/10* (2013.01); *F23G 2207/101* (2013.01); *F23N 2225/10* (2020.01); *F26B 2200/02* (2013.01)

(58) Field of Classification Search
CPC .... F23G 5/04; F23G 2201/10; F23G 2201/90; F23G 2206/10; F26B 3/04; F26B 2200/02
See application file for complete search history.

(56) References Cited

U.S. PATENT DOCUMENTS

2014/0082998 A1*   3/2014   Brock ....................... C10L 5/44
                                                                  44/589

FOREIGN PATENT DOCUMENTS

WO    WO2013166571 A1    11/2013

* cited by examiner

*Primary Examiner* — David J Laux

(57) ABSTRACT

The continuous process of the present invention is intended to obtain dry biomass from two treatment steps by drying organic waste. The waste previously sieved and crushed waste are dumped into a first dryer, inside of which temperatures are between 280° C. and 300° C. at the inlet thereof and between 90° C. and 100° C. at the outlet, then passing to a conveyor belt where at room temperature a partial cool-down occurs and the waste is dumped into a second dryer inside of which the temperatures are between 180° C. and 200° C. at the inlet and between 75° C. and 85° C. at the exit, completing the process, during which the interior of the dryers is maintained in negative pressure through exhaust flow and the oxygen content is kept between 5 and 7%.

7 Claims, 1 Drawing Sheet

(51) Int. Cl.
*F26B 3/04* (2006.01)
*F26B 23/02* (2006.01)

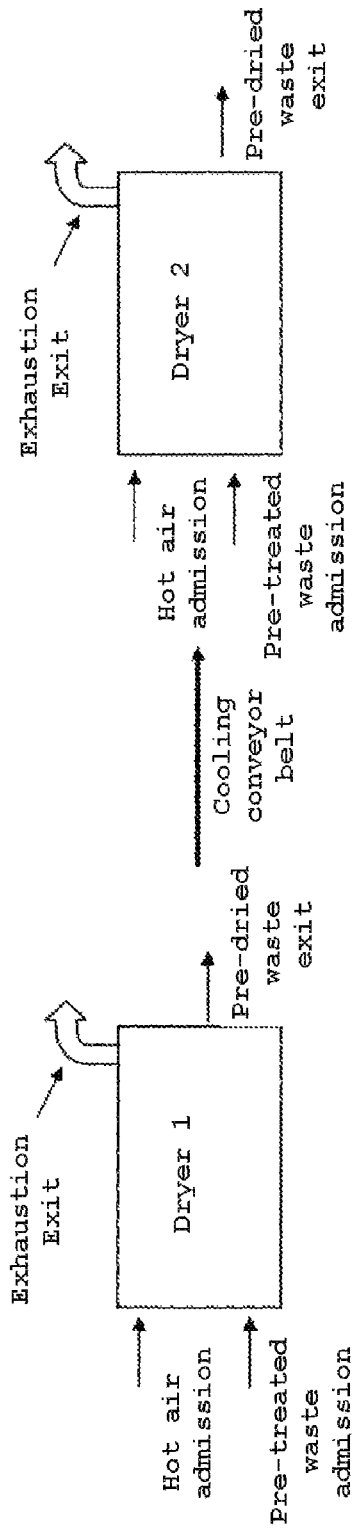

PROCESS FOR PRODUCING BIOMASS BY TREATMENT OF ORGANIC WASTE WITH TWO-STEP DRYING

The present invention relates to an improved continuous process of treatment of total or predominantly organic waste with a high humidity load, resulting in the generation of dry biomass of high calorific value that can be designed to be used as raw material in various industrial processes or in power generation systems upon burning thereof.

The process of present invention has an ideal application in a household waste treatment system obtaining dry biomass as its final product and optionally calcium carbonate as a by-product. The resulting dry biomass shows high calorific value, whereby the process becomes a renewable, clean and sustainable energy matrix.

BACKGROUND OF PRESENT INVENTION

Although the use of the process is not limited to the treatment of solid organic household waste, it is in this field that its exceptional advantages and opportunities are most evident, contributing to the solution of a public problem that is the destination of household and industrial waste, and providing economic value of the dry and sterilized biomass of high calorific value resulting from the process. The calorific value of dry biomass obtained by the process of present invention, which is around 3,500 Kcal per kilogram of dry biomass, is much higher than the calorific value of sugarcane bagasse or wood chips or shavings, for example, whose calorific value is between 1,800 and 2,200 Kcal. For a comparative evaluation of the good result obtained by the process, the untreated organic residues exhibit high contamination and contain, in general, between 40 and 70% of wet load and an average calorific value of only 1,400 Kcal, and demand for burning or incineration thereof high expenditure of energy, further that by the known processes only partial incineration is obtained in practice, reasons that make these processes unsatisfactory and economically unfeasible, in addition to other drawbacks, such as the high chlorine emission rate, which are overcome by the process of present invention.

Dumps and landfills are conventionally known as ways of discharging the collection of solid organic or inorganic waste, which is highly inconvenient for the environment due to the generation of vectors harmful to human health and for producing slurry, biogas and other pollutants.

The dumps consist of simple deposition of untreated waste in a certain area, directly on the ground, in the open, not obeying any control rule without any measure of protection to public health and the environment, even causing the presence of individuals dedicated to the highly unhealthy activity of collecting recyclable materials, known as "garbage collectors".

Such a method of disposing waste on the periphery of city areas is also extremely harmful to the health of those who live in the surroundings of the area, since the 'slurry', which consists of a dark colored liquid derived from the decomposition of organic matter, offers high potential for pollution, in addition to producing a bad smell and being a soil and groundwater compromising agent, responsible for the proliferation of vectors of a number of diseases transmitted by animals present, such as rats, cockroaches, flies, mosquitoes and others, and those are factors for devaluation of the region and the destruction of the land for long years for any type of use after soil saturation.

As for landfills, which are classified into two types, sanitary and controlled, despite of being a better option than landfills, they do not represent a satisfactory and definitive solution to the problem.

In case of landfill, the deposition of waste in compacted layers is kept in confinement, covered by earth or clay at the end of each working day to avoid bad odors and insects, the slurry being collected by drains and routed to tanks for treatment, and the biogas produced in storage being subsequently flared, polluting the environment. In the controlled landfill, solid household waste is technically confined, with no provision for measures to treat slurry, which also results in the burning of the resulting biogas, with the same drawbacks as the system previously described.

Major drawbacks, which make the continued use of landfills unfeasible, making them practically unfeasible, are the need for large areas, adequate land and limited useful life of the sites, generally around 50 years, in addition to the obligation to respect considerable distances from inhabited areas, airports and air bases.

Incineration is an option that is being applied to take advantage of heat through burning to obtain power generation. However, it is an unsatisfactory solution because it generates a high rate of chlorine, dioxin, furans and $CO_2$, and after burning, in most existing systems, about 70% of waste, resulting in a slag (remnants) of 30% that will have be discarded, thus not eliminating the need for new dumps or landfills. Integral waste incineration is only achieved by the use of very high temperatures, in some systems obtained by plasma, at extremely high costs.

The process of present invention provides the use of wet organic waste, which in household waste is mixed with dry or almost dry organic waste, such as paper, cardboard, chippings, dry leaves, etc., transforming that assembly of waste into dry and sterile biomass without the burning of any of the aforementioned waste during the process, which is a unique feature of the process and represents one of its great advantages over the prior art.

An additional advantage of the process of present invention is that the drying is performed in two steps, the second step requiring less calorific value that can be supplied by burning part of the dry biomass obtained by the process itself.

Although during the process, which is continuous and developed in two drying steps, high temperatures are used, reaching up to 300° C., at no time the incineration of dry or almost dry waste occurs such as paper, cardboard, chippings, leaves and other plant material occurs, that truly innovative feature being a great advantage of the process of present invention.

Thus, it is an objective of present invention to provide a process of sterilization and controlled drying of organic waste provided with moisture load, mixed or not with dry organic waste, obtaining as a final product dry biomass usable for several purposes, and additionally providing the utilization of gases resulting from the process that can be transformed into calcium carbonate.

When the process of present invention is applied in the treatment of household waste, which constitutes its preferred application, in a preliminary phase, non-organic waste present in household waste is separated by conventional procedures, and then the organic waste is subjected to drainage of slurry as well by conventional procedures that are collected in a collection box for further treatment, that operation is not within the scope of the process of present invention. Then the material to be treated, consisting of solid organic waste, the wet ones with their varying degrees of humidity and the dry ones are submitted to a step, still preliminary of the process, of grinding, carried out by a conventional grinder, so that the waste are prepared to be submitted to the process of the present invention itself, which will perform sterilization and drying thereof and, finally, transformation thereof into dry biomass.

In the preferred embodiment of the invention, the process itself begins with a step of sterilization and pre-drying of the organic waste previously prepared as described above, which is preferably carried by a conveyor provided with slits for a first rotary dryer fitted with internal direction fins, through which it moves with dwell time between 12 and 35 minutes, depending on the size of the system in which the process will be operated. In that first dryer, wet and non-wet waste, whose total wet load is between 40 and 70%, is subjected to sterilization and pre-drying under controlled temperatures between 280° C. and 300° C. at the inlet of the dryer and between 90° C. and 100° C. at the outlet, and in this step it is eliminated the majority of the wet load and bacteriological agents. The waste at the outlet of first dryer is continuously dumped on a conveyor belt; during the displacement thereof an intermediate step of partial cooling occurs, and then the waste is continuously dumped in a second rotary dryer, whose characteristics are the same as those of the first dryer, in which it will be finalized the process with the second drying step. The second rotary dryer operates with controlled temperatures between 180° C. and 200° C. at the inlet of the dryer and between 75° C. and 85° C. at the outlet. The heat required to carry out the process for generating heated air flow is supplied in its initial step by the combustion of LPG or other conventional fuel source by a furnace coupled to the inlet of first dryer; and in the second step the heat is provided by burning in a furnace coupled to the inlet of second dryer part of the dry biomass obtained by the process itself at its end, thus generating a very low level of energy consumption cost for the operation of the process. The process of present invention can be complemented by a process to control the emission of gases and particles in suspension resulting from the burning in the furnaces and drying in the rotary dryers, in which the gases, predominantly carbon dioxide gas, are sucked and directed to conventional equipment for treatment thereof that may include, among others, and concomitantly or not decontamination and transformation into calcium carbonate or sodium carbonate.

Both the dry biomass obtained by the process of present invention and the calcium or sodium carbonate resulting from the treatment of the emission gases represent great economic value, in addition to the fact that the process of the present invention constitutes an option for a clean, renewable and sustainable energy matrix, and contributing to the solution of the final destination of household waste and organic industrial waste, avoiding disposal thereof in dumps and landfills.

The present application also comprises several innovative and new elements in relation to previous applications, more specifically the Brazilian patent application BR112014027926-8 of May 7, 2013.

BRIEF DESCRIPTION OF DRAWINGS

FIG. 01 is a flowchart illustrating a process for obtaining biomass treating organic waste by two-step drying, in accordance with an embodiment.

DESCRIPTION OF THE INVENTION

To describe the process in a preferred embodiment, an equipment configuration is considered in which the two rotary cylindrical dryers will be each 12 meters long and 2 meters in diameter, being interconnected by a conveyor belt and cooler whose length will be between 15 and 20 meters, with the objective of treating a load of approximately 10 tons/hour of load of predominantly organic waste, containing in its total wet load between 40 to 70%, which were previously separated from slurry and non-organic materials, selected through a series of sieves and finally crushed, the treatment of these crushed residues aiming to transform them into dry and sterilized biomass. The waste load to be subjected to the process is initially dumped continuously on a conveyor belt through which it is dumped at the inlet of the first dryer provided with fins and is then routed for a certain transit or dwell time between 20 to 30 minutes, under temperatures between 280° C. and 300° C. at the inlet of the dryer, which gradually decays to temperatures between 90° C. and 100° C. at the exit thereof, and at that step between 20 and 35% of the existing wet load are removed (about 50% of the total wet load) in the waste, said temperatures being produced by the hot air produced by a furnace coupled to the inlet of the dryer.

Due to the high temperatures required for that first step, the furnace must be fueled by high calorific value fuel, which may be LPG or natural gas. In this first step of sterilization and pre-drying, it is produced inside the dryer a flow of hot air in depression (negative pressure), the flow being activated by a powered exhaust fan positioned at the outlet of the first dryer, that hot air flow acting to release wet waste present in the waste in the form of steam, being present in the same carbon dioxide and other gases and micro-particles in suspension, they are conducted through an exhaust duct to a gas scrubber and then continuously to a parallel step and complementary to the process that consists of treating the gases with a view of transforming them into a by-product (calcium carbonate or sodium carbonate).

The temperatures in the first dryer are controlled from a temperature sensor positioned at the outlet of the dryer, with the temperature sensor acting through a computerized control means on the electronic flame burner of the furnace.

In the present invention, it is contemplated the enclosing of the transport ducts for cooling between furnaces/burners and between the second burner and the storage silo comprising the enclosing of the transport ducts for water cooling, providing a continuous and safe process without the possibility of self-combustion of the material in the processing.

Thus, the internal duct that transports the heated mass passes through a duct with a larger external radius, where water circulates to cool the mass in transport through the internal duct.

The temperature control of the mass during transport is essential for regulating the amount/intake of air, as well as for regulating the negative pressure.

As per the embodiment of the present invention, the depression (negative pressure) is obtained by using, in both dryers, 12.5 hp exhaust fans operating in relation to a 24 m3 environment (estimated volume of the burners at a rate of 2 m3/HP. Said depression (negative pressure) is fundamental for attaining the purpose of the process of present invention since it maintains the rate of oxidizing gas (oxygen) in about 5 to 7% of the total volume of oxygen gas, being preferable the rate of 6%, preventing the burning of waste subjected to high temperatures.

Then the load of semi-dry waste is dumped at the outlet of the first dryer on a conveyor belt in which said load will be continuously transported at room temperature for about 8 to 12 minutes and thus partially cooled, upon using ducts with a cooling capacity of the mass, and at the end of the conveyor belt it is dumped into the second rotary dryer in which passage 15 to 35%, or 20 to 35% of the remaining wet load (about 50% of total wet load) will be removed, completing the drying.

The second dryer has the same characteristics as the first dryer, being provided with guiding fins for the waste coming from pre-drying, which transit or dwell time in the second dryer will be between 20 to 30 minutes, under temperatures between 180° C. to 200° C. at the inlet of the dryer, which gradually decay to temperatures between 75° C. to 85° C. at the outlet thereof, also upon the use of ducts having cooling capacity of the mass, in that step being removed the remaining wet load still present in the waste, said temperatures being produced by the hot air produced by a furnace coupled to the inlet of the dryer.

Due to the lower temperatures required for this second step, the furnace can be fed by the resulting dry biomass at the end of the process. In this step, similar to the first step, it is produced inside the dryer a flow of hot air in depression (negative pressure), the flow being activated by a powered exhaust fan positioned at the outlet of the second dryer, that hot air flow acting to release wet waste present in the waste in the form of steam, being present in the same carbon dioxide and other gases and micro-particles in suspension, that are conducted through an exhaust duct to a gas scrubber and then continuously to a parallel step and complementary to the process that consists of treating the gases with a view of transforming them into a by-product (calcium carbonate or sodium carbonate). The temperatures in the second dryer are controlled from a temperature sensor positioned at the outlet thereof, with the temperature sensor acting through a computerized control means on the electronic flame burner of the furnace.

Said Process Controls—inlet temperature, outlet temperature, rotation speed, dwell time, exhaustion rate, etc.—are adjusted according to the load to be subjected to the treatment process and/or according to the behavior of the material during the passage through the dryer/burner.

The external variables to be considered are: amount of water in the load submitted to the process, standard of the load submitted to the process, and season of year when processing will take place, depending on the season—rain or low humidity—the variation of liquid in the waste can be from 35% to 45% by weight.

The present invention further provides the reaction of calcium hydroxide ($Ca(OH)_2$) with carbon dioxide ($CO_2$).

As explained, calcium hydroxide—$CaO+H_2O \rightarrow Ca(OH)_2$—is previously formed, which is then reacted with carbon dioxide, forming Calcium Carbonate and water—$Ca(OH)_2 + CO_2 \rightarrow CaCO_3 + H_2O$.

These procedures take place in a separate circuit, in the same organic waste processing plant, using $CO_2$ from the burning in the furnaces.

Another point is to feed the burners with the biomass produced. Once the process has started with, for example, LPG to produce the first tons of biomass, the furnace is then fed with the biomass produced in the process.

Notwithstanding the present invention being illustrated according to a currently preferred embodiment, it is understood that the same is not a limitation of the invention since changes and modifications will be readily apparent to those skilled in the art at each application of the process considering the foregoing. Therefore, the invention should be limited only by the scope of the following claims.

What is claimed is:

1. A process for obtaining dry biomass upon treating organic waste through two drying steps, characterized by comprising continuous steps, said steps being controlled using controllers, said controllers adjusting load quantity, firing temperature, passage speed and negative pressure to be employed, the process comprising:
   continuously transporting wet waste through conveyor belts containing mostly organic waste, previously sieved and crushed, dumping them into a first inlet located at one end of a first rotating cylindrical dryer conducting waste towards a first dryer outlet located at the other end thereof, an interior of the first rotating cylindrical dryer showing temperatures, generated by supply of hot air, between 250° C. and 300° C. at the first inlet of the first rotating cylindrical dryer and between 90° C. and 100° C. at the first dryer outlet thereof of the first rotating cylindrical dryer;
   subjecting the waste to pre-drying treatment during a first dwell time in their displacement in the first rotating cylindrical dryer, between 20 and 30 minutes, removing above 50% of wet load present in the waste by creating negative pressure at the first dryer outlet resulting in flow of hot air;
   removing from the interior of the first rotating cylindrical dryer during the pre-drying treatment, the wet load released in the form of steam through a first exhaust duct positioned near the first dryer outlet of the first rotating cylindrical dryer;
   dumping pre-dried waste on a conveyor belt where it will move at room temperature, being cooled down during a dwell time, which will be between 20 and 30 minutes, and dumping the pre-dried waste continuously into a second inlet of a second rotating cylindrical dryer, an interior of the second rotating cylindrical dryer showing temperatures, generated by supplying hot air, between 180° C. and 200° C. at the second inlet thereof and between 75° C. and 85° C. at a second dryer outlet thereof of the second rotating cylindrical dryer;
   carrying pre-dried waste through the second rotating cylindrical dryer for a second dwell time around 20 minutes, subjecting it to final drying, removing remaining wet load present in the waste by creating negative pressure at the second dryer outlet resulting in flow of hot air;
   removing from the interior of the second rotating cylindrical dryer during the final drying step, the remainder of the wet load is released in the form of steam through a second exhaust duct provided near the second dryer outlet of the second rotating cylindrical dryer; and
   transporting biomass resulting from the previous steps to a storage silo said process further comprising cooling while transportation of the biomass through a passage between the first rotating cylindrical dryer and the second rotating cylindrical dryer, and between the second rotating cylindrical dryer and the storage silo, wherein the cooling is obtained by passage of a cooling element absorbing heat from the biomass as the biomass is in transit.

2. The process according to claim 1, characterized in that the cooling element is water.

3. The process, according to claim 1, characterized in that the intensity of the flames in the first and second rotating cylindrical dryers respectively is controlled by computerized control means from temperature data collected by sensors installed at the first and second dryer outlet of the first and second rotating cylindrical dryers respectively, said controllers being adjusted according to the load to be subjected to the treatment process and/or according to the behavior of the material during the passage through the first and the second rotating cylindrical dryer.

4. The process, according to claim 1, characterized in that the oxygen content inside the first and second rotating cylindrical dryers upon flow of hot air in depression by exhaustion (negative pressure) is kept around 5% to 7%.

5. The process, according to claim 1, characterized by comprising the reaction of calcium hydroxide ($Ca(OH)_2$) with carbon dioxide ($CO_2$), the reaction taking place in a separate circuit, in the same organic waste processing plant, using CO2.

6. The process, according to claim 1, characterized in that the organic waste subjected to treatment of pre-drying sterilization and drying are organic waste of household waste.

7. The process, according to claim 1, characterized in that the organic waste subjected to pre-drying and drying treatment is organic waste of household waste that was previously separated from the non-organic waste present in the waste, submitted to drainage of slurry present therein, and subjected to crushing.

\* \* \* \* \*